United States Patent [19]

Misawa et al.

[11] Patent Number: 5,387,665
[45] Date of Patent: Feb. 7, 1995

[54] RESINS FOR ELECTROHOTOGRAPHIC TONERS

[75] Inventors: Akira Misawa; Masanobu Ajioka, both of Kanagawa, Japan

[73] Assignee: Mitsui Toatsu Chemicals, Inc., Tokyo, Japan

[21] Appl. No.: 202,099

[22] Filed: Feb. 25, 1994

[30] Foreign Application Priority Data

| Feb. 26, 1993 | [JP] | Japan | 5-038056 |
| Feb. 26, 1993 | [JP] | Japan | 5-038057 |
| Feb. 26, 1993 | [JP] | Japan | 5-038058 |
| Feb. 26, 1993 | [JP] | Japan | 5-038059 |
| Feb. 26, 1993 | [JP] | Japan | 5-038060 |
| Feb. 26, 1993 | [JP] | Japan | 5-038061 |
| Feb. 26, 1993 | [JP] | Japan | 5-038062 |
| Feb. 26, 1993 | [JP] | Japan | 5-038063 |

[51] Int. Cl.$^6$ .............................. C08G 18/42
[52] U.S. Cl. ........................ 528/81; 528/271; 528/354; 560/158; 560/180; 560/182; 560/186
[58] Field of Search ............. 528/81, 271, 354; 560/158, 180, 182, 186, 189

[56] References Cited

U.S. PATENT DOCUMENTS

| 2,416,485 | 2/1947 | Lasher | 260/405 |
| 4,186,003 | 1/1980 | Marsh et al. | 430/97 |
| 4,826,945 | 5/1989 | Cohn et al. | 528/76 |
| 4,981,923 | 1/1991 | Hagiwara et al. | 525/440 |
| 5,004,664 | 4/1991 | Fuller et al. | 430/106.6 |
| 5,037,715 | 8/1991 | Hagiwara et al. | 403/109 |

FOREIGN PATENT DOCUMENTS

| 0256136 | 2/1988 | European Pat. Off. |
| 834260 | 11/1938 | France |
| 4-179967 | 6/1992 | Japan |
| 4-218063 | 8/1992 | Japan |
| WO92/01245 | 1/1992 | WIPO |

OTHER PUBLICATIONS

Die Makromolekulare Chemie, vol. 190, Oct. 1989, No. 10, Hironobu Fukuzaki, et al., "Low-Molecular-Weight Copolymers Composed of L-Lactic Acid and Various DL-Hydroxy Acids as Biodegradable Carriers", pp. 2571-2577.

Primary Examiner—Maurice J. Welsh
Attorney, Agent, or Firm—Oblon, Spivak, McClelland, Maier & Neustadt

[57] ABSTRACT

A resin for electrophotographic toner comprising a degradable polyester resin which is an amorphous poly (α-hydroxycarboxylic acid) prepared by direct dehydration-polycondensation of an α-hydroxycarboxylic acid and having, preferably, a number-average molecular weight ranging from 2000 to 7000. A further resin for electrophotographic toner comprising a degradable polyester resin which may be prepared by reacting an amorphous or semicrystalline poly (α-hydroxycarboxylic acid), having a number-average molecular weight ranging from 1000 to 7000 or 2000 to 7000 and prepared by direct dehydration-polycondensation of an α-hydroxycarboxylic acid, with a polyol having at least three hydroxyl groups or a polycarboxylic acid having at least three carboxyl groups in the molecule and, in case of the reaction product with the polyol can further be reacted with a diisocyanate to give an urethane-modified polyester. These polyesters can likewise be used as resins for toner.

8 Claims, No Drawings

RESINS FOR ELECTROHOTOGRAPHIC TONERS

BACKGROUND OF THE INVENTION (a) Field of the Invention

The present invention relates to a resin used in a toner for use in-the electrophotography and more specifically to a degradable binder resin for electrophotographic toners.

(b) Description of the Prior Art

The electrophotography technique comprises the steps of forming, through a variety of means, electrostatic latent images on a light-sensitive material while making use of a photoconductive substance, then developing the latent images with a toner, optionally transferring the images on an image-support such as paper and thereafter fixing the toner images thus formed by passing through, for instance, heated rolls to thus give desired images. There have been investigated a variety of substances for use as resins for preparing toners. Among these, polyester resins have widely been used as resins for preparing heated roll-fixable toners, because of their good ability of dispersing, therein, various additives for toners such as carbon black, good ability of wetting transfer paper and excellent fixability or the like.

In addition, the quantity of paper commonly used in copying apparatuses and optical printers have rapidly been increased recently and the amount of paper abandoned or thrown into fire is correspondingly increased. This becomes a serious problem from the viewpoint of concervation of natural resources and the techniques for reclaiming and reusing such paper commonly used have been increasingly important from the viewpoint of prevention of environmental pollution and concervation of natural resources. To this end, it is desirable that the toner used in copying apparatuses and optical printers be able to efficiently be decomposed through the alkali hydrolysis during deinking and reclaiming processes for paper and efficiently be removed from the fibers of the paper. In this respect, the styrene binder resins usually used are hardly hydrolyzed with an alkali. On the other hand, it is known that resins for toner comprising degradable polyesters such as poly-( $\alpha$-hydroxycarboxylic acid) exhibit high deinkability and are thus useful in the paper-recycle (see, for instance, WO 92/01245). Moreover, abandoned toners and/or resins for toners are sometimes buried in the ground. However, the conventional resins for toners are insufficient in biodegradability. For this reason, there has been desired for the improvement of these resins for toners from the viewpoint of disposition of waste and environmental pollution. In this respect, it has been known that the toners comprising degradable polyesters are decomposed in the ground (see, for instance, Japanese Unexamined Patent Publication (hereunder referred to as "J.P. KOKAI") No. Hei 4-179967 and U.S. Pat. No. 5,004,664).

Moreover, there have also been known various methods for synthesizing poly-($\alpha$-hydroxycarboxylic acids) as resins for toners which comprise once converting an $\alpha$-hydroxycarboxylic acid into a cyclic dimer thereof, then separating and purifying the cyclic dimer and subjecting the dimer to the ring opening polymerization in the presence of a catalyst such as an aluminum catalyst.

The crystalline resins for toners each has an extremely high viscosity at a temperature lower than the melting point thereof, but has an extremely low viscosity at a temperature higher than the melting point. This inevitably increases the lowest temperature (or the lowest fixing temperature) required for fusing the toner and for adhering it to paper. In addition, the toner is heated on the surface of a hot rolls, the viscosity thereof is thus substantially reduced and this results in the so-called hot-offset phenomenon and in turn to contamination of the hot roll surface. The resins for toners must start flowing at a low temperature and must have sufficiently high viscosities at a high temperature in order to simultaneously satisfy the requirements for fixability and resistance to hot-offset.

The conventional degradable polyester-based resins for toners are hardly pulverized and it is accordingly difficult to use them as binder resins for toners having a particle size on the order of 10 $\mu$m, 90% of which is occupied by the binder resins. Therefore, these degradable polyesters should further be improved. Moreover, polyesters other than degradable polyesters as well as styrene polymers can easily be pulverized, but are inferior in hydrolyzability, degradability with an alkali and biodegradability and thus these polymers require further improvement.

Furthermore, products obtained by dimerizing an $\alpha$-hydroxycarboxylic acid into a cyclic dimer through dehydration are in general lactides and glycollides used in the preparation of polyesters through the ring opening polymerization and, therefore, the polyesters thus prepared are too expensive to use as resins for toners. There has thus been desired for the development of cost-saving methods for preparing degradable polyesters usable as toner-resins through direct polymerization. In addition, the ring opening polymerization which is cation ring opening polymerization and accordingly requires the use of non-aqueous solvents and removal of ionic species serving as Polymerization-terminators. This leads to reduction of production efficiency. Further polyols and polycarboxylic acids generally used in the production of polyesters cannot be used or the monomers usable in the production of such polyesters are limited to only cyclic esters. In this polymerization, it is not easy to control physical properties required for resins used in toners and to perform copolymerization with a variety of monomers for controlling the balance between the degradability and physical properties of the polyester.

In addition, each resin used in toners comprising a degradable polyester has a hydroxyl group on one end and a carboxyl group on the other end and the resin limits the charging properties of the resulting toners or can provide only toners capable of being strongly positively and weakly negatively charged due to the presence of carboxyl groups having an ability of being strongly negatively charged. Accordingly, the resulting toner cannot be used in the copying apparatuses equipped with organic light-sensitive materials.

In this case, the resin can further be polycondensed to reduce the content of the terminal carboxyl groups, but this leads to an increase in the molecular weight of the resulting resin and hence to a decrease in the grindability thereof. As a result, the resin does not have a particle size suitable for the production of excellent toners. On the other hand, the forcible pulverization thereof requires extremely high pulverization energy and is impractical from the economical standpoint.

SUMMARY OF THE INVENTION

Accordingly, an object of the present invention is to provide a resin used in the preparation of a toner for electrophotography and more specifically to a degradable binder resin for toners.

The inventors of this invention have conducted intensive studies to solve the foregoing problems and to develop a resin having excellent properties and used for the production of toners exhibiting desired characteristic properties, found out a novel resin having excellent properties which have never been achieved by the conventional techniques and thus have completed the present invention.

According to a first aspect of the present invention, there is provided a resin for electrophotographic toner comprising an amorphous poly-($\alpha$-hydroxycarboxylic acid) which is a degradable polyester resin and prepared by direct dehydration-polycondensation of an $\alpha$-hydroxycarboxylic acid.

According to a second aspect of the present invention, there is provided a resin for electrophotographic toner comprising an amorphous poly($\alpha$-hydroxycarboxylic acid) which is a degradable polyester resin having a number-average molecular weight ranging from 2000 to 7000 and prepared by direct dehydration-polycondensation of an $\alpha$-hydroxycarboxylic acid.

According to a third aspect of the present invention, there is provided a resin for electrophotographic toner comprising a degradable polyester resin which is prepared by reacting an amorphous poly-($\alpha$-hydroxycarboxylic acid), having a number-average molecular weight ranging from 1000 to 7000 and prepared by direct dehydration-polycondensation of an $\alpha$-hydroxycarboxylic acid, with a polyol having at least three hydroxyl groups in the molecule and which has a rate of the terminal hydroxyl groups of not less than 90% of the total terminal groups of the polyester.

According to a fourth aspect of the present invention, there is provided a resin for electrophotographic toner comprising an urethane-modified polyester which is a degradable polyester produced by reacting a diisocyanate with a polyester, which is prepared by reacting an amorphous poly( $\alpha$-hydroxycarboxylic acid) having a number-average molecular weight ranging from 2000 to 7000 and prepared by direct dehydration-polycondensation of an $\alpha$-hydroxycarboxylic acid with a polyol having at least three hydroxyl groups in the molecule, so that isocyanate groups are added to the polyester in an amount of not less than 0.8 molar equivalent per molar equivalent of the hydroxyl group of the latter.

According to a fifth aspect of the present invention, there is provided a resin for electrophotographic toner comprising a degradable polyester which is produced by reacting an amorphous poly($\alpha$-hydroxycarboxylic acid) having a number-average molecular weight ranging from 1000 to 7000 and prepared by direct dehydration-polycondensation of an $\alpha$-hydroxycarboxylic acid with a polycarboxylic acid having, in the molecule, at least three carboxyl groups and which has a rate of the terminal carboxyl groups of not less than 90% of the total terminal groups of the degradable polyester.

According to a sixth aspect of the present invention, there is provided a resin for electrophotographic toner comprising a degradable polyester resin which is prepared by reacting a semicrystalline poly-($\alpha$-hydroxycarboxylic acid) which has a number-average molecular weight ranging from 1000 to 7000 and which is prepared by direct dehydration-polycondensation of an $\alpha$-hydroxycarboxylic acid with a polyol having at least three hydroxyl groups in the molecule and which has a rate of the terminal hydroxyl groups of not less than 90% of the whole terminal groups of the degradable polyester.

According to a seventh aspect of the present invention, there is provided a resin for electrophotographic toner comprising an urethane-modified polyester which is a degradable polyester produced by reacting a diisocyanate with a polyester, which is prepared by reacting a semicrystalline poly ( $\alpha$-hydroxycarboxylic acid) having a number-average molecular weight ranging from 2000 to 7000 and prepared by direct dehydration-polycondensation of an $\alpha$-hydroxycarboxylic acid with a polyol having at least three hydroxyl groups in the molecule, so that isocyanate groups are added to the polyester in an amount of not less than 0.8 molar equivalent per molar equivalent of the hydroxyl group of the latter.

According to an eighth aspect of the present invention, there is provided a resin for electrophotographic toner comprising a degradable polyester resin which is prepared by reacting a semicrystalline poly-($\alpha$-hydroxycarboxylic acid) having a number-average molecular weight ranging from 1000 to 7000 and prepared by direct dehydration-polycondensation of an $\alpha$-hydroxycarboxylic acid with a polycarboxylic acid having at least three carboxyl groups in the molecule and which has a rate of the terminal carboxyl groups of not less than 90% of the whole terminal groups of the degradable polyester.

DETAILED DESCRIPTION OF THE INVENTION

The term "amorphous poly-($\alpha$-hydroxycarboxylic acid)" herein used means "poly($\alpha$-hydroxycarboxylic acid)" which does not have a melting point and is prepared by directly dehydrating and polycondensing a mixture of optical isomers of $\alpha$-hydroxycarboxylic acid or several kinds of $\alpha$-hydroxycarboxylic acids. The presence of any melting point can be confirmed by a thermal property-determining device generally used such as DSC. In the preparation of amorphous poly-($\alpha$-hydroxycarboxylic acid) of this type, the content of the optical isomers is at least 10 mole% and more preferably at least 20 mole% on the basis of the molar amount of the whole $\alpha$-hydroxycarboxylic acid monomers. This is because if the content thereof is less than 10 mole%, the resulting poly-($\alpha$-hydroxycarboxylic acid) has a clear melting point and impairs the fixability of the final toner product. Amorphous poly-($\alpha$-hydroxycarboxylic acid) prepared by other means such as copolymerization of different kinds of $\alpha$-hydroxycarboxylic acids can likewise be used in the present invention in addition to the foregoing poly-($\alpha$-hydroxycarboxylic acids). In other words, the amorphous poly($\alpha$-hydroxycarboxylic acids) usable herein are not limited to those prepared by the specific production methods and those having specific mixing ratios of monomers.

In addition, the term "semicrystalline poly($\alpha$-hydroxycarboxylic acid)" means, contrary to the foregoing amorphous polymer, a poly-($\alpha$-hydroxycarboxylic acid) which has a clear melting point and is prepared by directly dehydrating and polycondensing an $\alpha$-hydroxycarboxylic acid. In the preparation of semicrystalline poly($\alpha$-hydroxycarboxylic acid) of this type, the content of the optical isomers is less than 10 mole% and more preferably 0 to 5 mole% on the basis of the molar amount of the wholes α-hydroxycarboxylic acid monomers used. If the content of the optical isomer is not less than 10 mole%, the resulting poly-(α-hydroxycarboxylic acid) becomes amorphous since it does not show any clear melting point. There has not been known any polymer having a crystallinity of 100% as determined by a large angle X-ray diffraction technique and therefore, the term "crystalline polymers" naturally means semicrystalline polymers. Thus, the term "semicrystalline poly α-hydroxycarboxylic acid)" herein means all of the poly-(α-hydroxycarboxylic acids) having melting points irrespective of their crystallinity, or those at least having crystalline portions capable of being detected by a means for determining thermal properties. If a semicrystalline poly(α-hydroxycarboxylic acid) is used, a poly-(α-hydroxycarboxylic acid) having a relatively low molecular weight must inevitably be used for controlling the crystallinity thereof to a low level, but the resulting polymer has a low glass transition temperature. This leads to the formation of a toner showing low storage stability, or the polymer cannot be pulverized at ordinary temperature and accordingly, cannot be used for preparing toners. For this reason, the semicrystalline poly(α-hydroxycarboxylic acid) must be cocondensed with a polyol or a polycarboxylic acid to increase the molecular weight thereof and to thus elevate the glass transition temperature.

Examples of α-hydroxycarboxylic acids usable in the invention include glycolic acid, D- and L-isomers of lactic acid, oxybutyric acid, malic acid, mandelic acid, tartaric acid and mixture thereof, with glycolic acid and lactic acid being preferred and lactic acid being particularly preferred.

The direct dehydration-polycondensation herein used is a method for preparing poly-(α-hydroxycarboxylic acid) essentially different from the ring opening polymerization of glycollides or lactides. More specifically, the ring opening polymerization fundamentally belongs to a polyaddition reaction, while the direct dehydration-polycondensation used herein belongs to a polycondensation reaction. According to the direct dehydration-polycondensation, α-hydroxycarboxylic acids can be polycondensed at a temperature, at which any cyclic dimerization of α-hydroxycarboxylic acids is not caused, while refluxing a solvent used to give a desired polymer. Moreover, a polymer having a relatively high molecular weight can be prepared by dehydrating and polycondensing the monomer in the presence of a proper solvent.

The direct dehydration-polycondensation will further be detailed below. This method can be performed by, for instance, adding a condensation catalyst such as tin powder to an α-hydroxycarboxylic acid, distilling off water and a solvent, for instant, an ether solvent such as diphenyl ether or anisole or other azeotropic solvents at a temperature ranging from about 130° to 150° C. under reduced pressure, then separating water from the solvent thus distilled off in a water separator, passing the dehydrated solvent through a column packed with a dehydrating agent such as Molecular Sieve 3A to give substantially anhydrous solvent and recycling it to the reactor, to thus prepare the intended poly-(α-hydroxycarboxylic acid).

The poly-(α-hydroxycarboxylic acid) produced by the method of the invention has a higher-order structure different from that of the poly(α-hydroxycarboxylic acid) produced through the ring opening polymerization of the dimer of α-hydroxycarboxylic acid. In other words, the poly (α-hydroxycarboxylic acid) produced through the ring opening polymerization of the dimer comprises only polymer molecules whose degree of polymerization is even number, while the polymer produced by the direct method comprises molecules whose degree of polymerization is not limited to a specific range.

Moreover, the ring opening polymerization allows the formation of a copolymer of D- and L-isomers by copolymerizing the cyclic dimer of a D-isomer with the cyclic dimer of an L-isomer or subjecting a racemic mixture to the ring opening polymerization, but the sequence of the resulting copolymer always comprises dyad arrangement as a unitary segment. On the other hand, such a copolymer produced by the direct method of the invention has a sequence comprising completely randomly arranged D- and L-isomers of the monomer.

In the present invention, the polyols reacted with the poly(α-hydroxycarboxylic acid) include, for instance, glycerin, trimethylolpropane, trimethylolethane, pentaerythritol and dipentaerythritol. The polyol preferably has not less than 3 hydroxyl groups in the molecule. If the polyol has only two hydroxyl groups, the resistance to hot-offset of the resulting toner is impaired.

In addition, the polycarboxylic acids reacted with the poly (α-hydroxycarboxylic acid) include, for instance, polycarboxylic acids such as trimellitic acid and pyromellitic acid , and anhydrides and lower esters thereof . The polycarboxylic acid preferably has not less than 3 carboxyl groups in the molecule. If the polycarboxylic acid has only two carboxyl groups, the resistance to hot-offset of the resulting toner is impaired.

If polyester is used as a resin for toner, the charging ability of the resin often strongly affects the polarity of the charged toner and the quantity of electrostatic charges generated thereon and this seems to mainly result from the charging ability of the terminal groups of the polyester. The poly (α-hydroxycarboxylic acid) of the present invention likewise requires sufficient investigation of the kinds of the terminal groups. As a result of the investigation into this point, it has been confirmed that if less than 90% of the terminal groups are hydroxyl groups, in case of toners capable of being positively charged, the quantity of positive charges generated thereon is substantially reduced and that if less than 90% of the terminal groups are carboxyl groups, in case of toners capable of being negatively charged, the quantity of negative charges generated thereon is substantially reduced.

Furthermore, the diisocyanate compounds reacted with polyester in the present invention are compounds each having two isocyanate groups in the molecule and they are used for further polymerizing, in particular, degradable polyesters having terminal hydroxyl groups. Specific examples of such diisocyanates include hexamethylene diisocyanate (HDI), tolylene diisocyanate (TDI), methylenebisphenyl diisocyanate (MDI), isophorone diisocyanate (IPDI) and tetramethylxylylene diisocyanate (TMXDI). The amount of isocyanate groups added to the polyester is not less than 0.8 molar equivalent per molar equivalent of the hydroxyl group of the latter. This is because if it is less than 0.8 molar equivalent, a desired effect of polymerization with isocyanate would not be expected. More specifically, the resulting toner does not show sufficiently improved storage stability and resistance to hot-offset.

The number-average molecular weight of the poly (α-hydroxycarboxylic acid) preferably ranges from 2000 to 7000. This is because if it is less than 2000, the polymer is not easily be pulverized, while if it exceeds 7000, the polymer has low grindability, does not provide fine toner particles and accordingly, modification of, for instance, conditions for pulverization is required. If the poly(α-hydroxycarboxylic acid) is further copolymerized with a polyol or polycarboxylic acid having at least three hydroxyl or carboxyl groups in the molecule, the number-average molecular weight of the poly- (α-hydroxycarboxylic acid) preferably ranges from 1000 to 7000. More specifically, if it is less than 1000, the resulting polyester shows insufficient storage stability, while if it exceeds 7000, the resulting polyester has low grindability, does not provide fine toner particles and accordingly, modification of, for instance, conditions for pulverization is required. In the case of an urethane-modified polyester obtained through the reaction of diisocyanate with a polyester comprising poly-(αhydroxycarboxylic acid) and a polyol having at least three hydroxyl groups in the molecule, the number-average molecular weight of the poly-(α-hydroxycarboxylic acid) preferably ranges from 2000 to 7000. If it is less than 2000, the amount of diisocyanate required is too high to control the ability of being positively charged to a low level, while if it exceeds 7000, the resulting urethane-modified polyester has low grindability, does not provide fine toner particles and accordingly, modification of, for instance, conditions for pulverization is required.

When the resin for electrophotographic toner is used in a toner composition for electrophotography, proper coloring agents and additives are, if necessary, incorporated into the resin to give a desired toner composition. Specific examples of the coloring agents and additives usable in the toner composition are as follows:

Appropriate coloring agents are, for instance, carbon black, Aniline Blue, Alcoyl Blue, Chrome Yellow, Ultramarine Blue, Quinoline Yellow, Methylene Blue, Phthalocyanine Blue, Malachite Green, Rose Bengale and Magnetite.

Additives may be, for instance, all kinds of conventionally known additives such as colloidal silica, zinc stearate, low molecular weight polypropylene, stearic acid amide, methylenebisstearoamide, magnetic powder and a variety of charge-controlling agents.

The toner can be prepared by mixing, in advance, the foregoing resin and other compounds to be incorporated in a Henschel mixer, melting and kneading at a temperature ranging from 100° to 180° C. in a device such as a kneader, pulverizing the resulting mass and then classifying to give a toner for electrophotography.

The present invention will hereunder be explained in more detail with reference to the following working Examples and the effects practically attained by the present invention will also be discussed in detail in comparison with Comparative Examples. In the following Examples and Comparative Examples, the term "part+" means "part by weight" unless otherwise specified. Moreover, the data in the following Tables are determined according to the following methods:

Molecular Weight: Number-average molecular weight determined by gel permeation chromatography (GPC) in which a monodisperse standard polystyrene is used as a reference, tetrahydrofuran as an eluent and refractometer as a detector, Glass Transition Temperature: is determined by a differential scanning calorimeter, Acid Value: This is determined according to the method specified in JIS K 5400.

Hydroxyl Value: This is determined according to the acetic acid anhydride method.

Volume-Average Particle Size: This is determined by Coulter Counter.

Fixing Rate Copies are formed using a commercially available copying apparatus (speed: 60 copies per minute), then the surface of the copies are subjected to the cellophane tape-peeling test and the remaining toner is inspected for the rate of reflection density which is defined to be "fixing rate".

Hot-Offset Temperature: This is defined to be the temperature on the surface of fixing rolls at which the offset phenomenon is observed.

Storage Stability: Each sample is visually observed and evaluated according to the following evaluation criteria:
1. There is not observed any agglomeration.
2. A specific sample contained in a container is partially agglomerated, but the agglomerates are disassembled if the container is lightly vibrated.
3. A specific sample contained in a container is partially agglomerated, but the agglomerates are disassembled if the container is strongly vibrated.
4. A specific sample in a container includes some agglomerates which are not disassembled even when the container is strongly vibrated.

Quantity of charge: This is determined by Blow-Off Charge-Determining Device (available from Toshiba Chemical Co., Ltd.).

Examples 1 to 7

To a 2 liter volume 4-necked flask equipped with a stirring machine, a thermometer, a water separator, a column packed with Molecular Sieve 3A, a tube for introducing nitrogen gas and a reflux condenser, there was added α-hydroxycarboxylic acids listed in the following Table 1, followed by dehydration-polycondensation of the monomer at a temperature of 150° C. and a reduced pressure of 66.5 hPa while refluxing 100 g of diphenyl ether and distilling off of the solvent under reduced pressure to give each corresponding poly-(α-hydroxycarboxylic acid) listed in Table 1.

There were mixed and dispersed, in a Henschel mixer, 100 parts of each poly<α-hydroxycarboxylic acid) prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.), then the mixture was melted and kneaded at 160° C. in a twin-screw kneader PCM 30 (available from Ikegai Corporation) to give a massive toner composition. This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 μm (containing 3% by weight of particles having a particle size of not more than 5 μm, 2% by weight of particles having a particle size of not more than 20 μm). The grindability of the toner was expressed in terms of the volume-average particle size determined after pulverizing coarse powder while feeding the powder to the jet pulverizer at a constant rate. The fixability and the offset ability of the toner was determined using a commercially available copying apparatus and at the same time, the hot rolls were inspected for the degree of contamination with the toner. After mixing 95 parts of a ferrite carrier F53-150 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by mixing the toner with 0.1% of hydrophobic silica (Aerosil R972, available from Nippon Aerosil co., Ltd.), storing the mixture in an environment maintained at a temperature of 40° C. and a relative humidity of 60% over 24 hours and then inspecting the toner particles for the agglomerated state thereof. The results thus obtained are listed in Table 1.

All of the toner examined showed excellent offset properties, but the fixability of the toners comprising crystalline resins was greatly different from that of the toners comprising amorphous resins. Preferred resins are amorphous poly($\alpha$-hydroxycarboxylic acids).

Moreover, it was confirmed that the degradable toner according to the present invention showed biodegradability since the toner was decomposed when burying in the ground at a temperature ranging from 20° to 25° C. over 20 weeks. On the other hand, when the toner was suspended in an alkaline aqueous solution having a pH of 14 at 50° C. for 24 hours, the resin was completely decomposed into its monomers, i.e., the resin showed an ability of being hydrolyzed with an alkali.

As seen from the data in Table 1, the resin for toner according to the present invention shows excellent fixability which would be resulted from a low flowing-initiating temperature of the resin. In other words, the resin exhibits characteristic properties favorable for use as a resin for electrophotographic toner.

according to the same procedures used in Examples 1 to 7 except that any refluxing solvent was not used.

There were mixed and dispersed, in a Henschel mixer, 100 parts of each poly($\alpha$-hydroxycarboxylic acid) prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.), then the mixture was melted and kneaded at 60° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 $\mu$m (containing 3% by weight of particles having a particle size of not more than 5 $\mu$m, 2% by weight of particles having a particle size of not more than 20 $\mu$m).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F95-100 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by mixing the toner with 0.1% of hydrophobic

TABLE 1

| Example Nos. | 1 | 2 | 3 | 4 | 5 | 6 | 7 |
| --- | --- | --- | --- | --- | --- | --- | --- |
| $\alpha$-hydroxycarboxylic acid(1) | L-L.A. | L-L.A. | L-L.A. | L-L.A. | L-L.A. | L-L.A. | L-L.A. |
| Amount of $\alpha$-hydroxycarboxylic acid(1) (mole) | 10.0 | 9.0 | 8.0 | 5.0 | 2.0 | 1.0 | 0.0 |
| $\alpha$-hydroxycarboxylic acid(2) | D-L.A. | D-L.A. | D-L.A. | D-L.A. | D-L.A. | D-L.A. | D-L.A. |
| Amount of $\alpha$-hydroxycarboxylic acid(2) (mole) | 0.0 | 1.0 | 2.0 | 5.0 | 8,0 | 9.0 | 10.0 |
| Molecular weight of poly-($\alpha$-hydroxycarboxylic acid) | 35300 | 36400 | 36700 | 37600 | 35600 | 33400 | 36800 |
| Polyhydric alcohol | Nil | Nil | Nil | Nil | Nil | Nil | Nil |
| Amount of polyhydric alcohol (mole) | | | | | | | |
| Number-average molecular weight of polyester obtained | 35300 | 36400 | 36700 | 7600 | 35600 | 33400 | 36800 |
| Glass transition point of polyester obtained (°C.) | 56.3 | 56.1 | 56.1 | 56.0 | 56.3 | 56.3 | 56.5 |
| Acid value of polyester (mg/g) | 0.7 | 0.7 | 0.7 | 0.7 | 0.7 | 0.7 | 0.7 |
| Hydroxyl value of polyester (mg/g) | 0.7 | 0.7 | 0.7 | 0.7 | 0.7 | 0.7 | 0.7 |
| Rate of hydroxyl groups in the terminal groups (%) | 50.0 | 50.0 | 50.0 | 50.0 | 50.0 | 50.0 | 50.0 |
| Volume-average particle size ($\mu$m) | 37.5 | 37.5 | 38.5 | 39.1 | 38.4 | 36.8 | 38.2 |
| Rate of fixing (%) | 12 | 82 | 90 | 91 | 90 | 82 | 18 |
| Hot-offset temperature (°C.) | 230 | 232 | 233 | 235 | 230 | 225 | 233 |
| Storage stability | 3 | 3 | 3 | 3 | 3 | 3 | 3 |
| Quantity of charge ($\mu$C/g) | 5.9 | 5.9 | 5.9 | 5.9 | 5.9 | 5.9 | 5.9 |

L-L.A. denotes L-lactic acid; D-L.A. denotes D-lactic acid.

EXAMPLES 8 to 12

Amorphous poly-($\alpha$-hydroxycarboxylic acids) were prepared by dehydration-polycondensation of $\alpha$-hydroxycarboxylic acids listed in the following Table 2 silica (Aerosil R972, available from Nippon Aerosil co., Ltd.), storing the mixture in an environment maintained at a temperature of 40° C. and a relative humidity of 60% over 24 hours and then inspecting the toner particles for the agglomerated state. The results thus obtained are listed in Table 2.

As seen from the data in Table 2, the degradable resins according to the present invention show excellent grindability, storage stability and abilities of being negatively charged and thus can effectively be used as resins for electrophotographic toner capable of being negatively charged.

TABLE 2

| Example Nos. | 8 | 9 | 10 | 11 | 12 |
|---|---|---|---|---|---|
| α-hydroxycarboxylic acid(1) | L-L.A. | L-L.A. | L-L.A. | L-L.A. | L-L.A. |
| Amount of α-hydroxycarboxylic acid(1) (mole) | 5.0 | 5.0 | 5.0 | 5.0 | 5.0 |
| α-hydroxycarboxylic acid(2) | D-L.A. | D-L.A. | D-L.A. | D-L.A. | D-L.A. |
| Amount of α-hydroxycarboxylic acid(2) (mole) | 5.0 | 5.0 | 5.0 | 5.0 | 5.0 |
| Molecular weight of poly-(α-hydroxycarboxylic acid) | 1000 | 2000 | 4000 | 7000 | 8000 |
| Polyhydric alcohol | Nil | Nil | Nil | Nil | Nil |
| Amount of polyhydric alcohol (mole) | | | | | |
| Number-average molecular weight of polyester obtained | 1000 | 2000 | 4000 | 7000 | 8000 |
| Glass transition point of polyester obtained (°C.) | −4.8 | 26.1 | 41.6 | 48.3 | 49.4 |
| Acid value of polyester (mg/g) | 56.1 | 28.1 | 14.0 | 8.0 | 7.0 |
| Hydroxyl value of polyester (mg/g) | 56.1 | 28.1 | 14.0 | 8.0 | 7.0 |
| Rate of hydroxyl groups in the terminal groups (%) | 50.0 | 50.0 | 50.0 | 50.0 | 50.0 |
| Volume-average particle size (μm) | Ungrindable | 5.6 | 7.3 | 9.0 | 11.2 |
| Rate of fixing (%) | | 99 | 99 | 99 | 98 |
| Hot-offset temperature (°C.) | | 155 | 157 | 165 | 184 |
| Storage stability | | 2 | 3 | 4 | 4 |
| Quantity of charge (μC/g) | | −43.5 | −21.7 | −12.4 | −10.9 |

L-L.A. denotes L-lactic acid; D-L.A. denotes D-lactic acid.

EXAMPLES 13 to 24

Amorphous poly-(α-hydroxycarboxylic acids) were prepared by dehydration-polycondensation of α-hydroxycarboxylic acids listed in the following Table 3 according to the same procedures used in Examples 1 to 7 except that any refluxing solvent was not used. Then each resulting poly-(α-hydroxycarboxylic acid) was further polycondensed with a polyhydric alcohol listed in Table 3 till the acid value of the polymer reached a predetermined level to give each corresponding polyester listed in Table 3.

There were mixed and dispersed, in a Henschel mixer, 100 parts of each polyester prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.) then the mixture was melted and kneaded at 160° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 μm (containing 3% by weight of particles having a particle size of not more than 5 μm, 2% by weight of particles having a particle size of not less than 20 μm).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F53-150 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated condition thereof. The results thus obtained are listed in Table 3.

As seen from the data in Table 3, the resins according to the present invention show excellent grindability, resistance to hot-offset, storage stability and abilities of being positively charged and thus can effectively be used as resins for electrophotographic toner capable of being positively charged.

TABLE 3

| Example Nos. | 13 | 14 | 15 | 16 | 17 | 18 | 19 | 20 | 21 | 22 | 23 | 24 |
|---|---|---|---|---|---|---|---|---|---|---|---|---|
| α-hydroxycarboxylic acid(1) | L-L.A. | L-L.A. | L-L.A. | L-L.A. | L-L.A. | L-L.A. | L-L.A. | L-L.A. | L-L.A. | L-L.A. | L-L.A. | L-L.A. |
| Amount of α-hydroxycarboxylic acid(1) (mole) | 5.0 | 5.0 | 5.0 | 5.0 | 5.0 | 5.0 | 5.0 | 5.0 | 5.0 | 5.0 | 5.0 | 5.0 |
| α-hydroxycarboxylic acid(2) | D-L.A. | D-L.A. | D-L.A. | D-L.A. | D-L.A. | D-L.A. | D-L.A. | D-L.A. | D-L.A. | D-L.A. | D-L.A. | D-L.A. |
| Amount of α-hydroxycarboxylic acid(2) (mole) | 5.0 | 5.0 | 5.0 | 5.0 | 5.0 | 5.0 | 5.0 | 5.0 | 5.0 | 5.0 | 5.0 | 5.0 |
| Molecular weight of poly-(α-hydroxycarboxylic acid) | 900 | 1000 | 4000 | 7000 | 8000 | 4000 | 4000 | 4000 | 4000 | 4000 | 4000 | 4000 |
| Polyhydric alcohol | Glyce. | Glyce. | Glyce. | Glyce. | Glyce. | Nil | Glyce. | E.G. | D.E.G. | T.M.E. | T.M.P. | P.E. |
| Amount of polyhydric alcohol (mole) | 0.778 | 0.700 | 0.175 | 0.100 | 0.088 | | 0.047 | 0.088 | 0.088 | 0.088 | 0.088 | 0.088 |
| Number-average molecular weight of polyester obtained | 2800 | 3100 | 12000 | 21000 | 24000 | 4000 | 8600 | 8000 | 8000 | 8500 | 8600 | 9000 |
| Glass transition point of polyester obtained (°C.) | 31.7 | 34.2 | 51.6 | 54.1 | 54.5 | 39.7 | 49.2 | 48.6 | 43.3 | 46.6 | 49.7 | 46.9 |
| Acid value of polyester (mg/g) | 3.0 | 2.7 | 0.7 | 0.4 | 0.3 | 14.0 | 2.6 | 0.7 | 0.7 | 0.7 | 0.7 | 0.7 |
| Hydroxyl value of polyester | 57.7 | 52.1 | 13.2 | 7.6 | 6.6 | 14.0 | 10.4 | 13.3 | 13.3 | 26.5 | 26.3 | 39.8 |

TABLE 3-continued

| Example Nos. | 13 | 14 | 15 | 16 | 17 | 18 | 19 | 20 | 21 | 22 | 23 | 24 |
|---|---|---|---|---|---|---|---|---|---|---|---|---|
| (mg/g) | | | | | | | | | | | | |
| Rate of hydroxyl groups in the terminal groups (%) | 95.1 | 95.1 | 95.0 | 95.0 | 95.7 | 50.0 | 80.0 | 95.0 | 95.0 | 97.4 | 97.4 | 98.3 |
| Volume-average particle size ($\mu$m) | 7.3 | 7.7 | 16.4 | 26.4 | 31.4 | 8.8 | 13.4 | 12.0 | 13.2 | 12.8 | 12.9 | 13.0 |
| Rate of fixing (%) | 99 | 98 | 96 | 93 | 92 | 99 | 98 | 99 | 99 | 95 | 98 | 100 |
| Hot-offset temperature (°C.) | 193 | 193 | 199 | 206 | 208 | 131 | 169 | 165 | 165 | 165 | 166 | 167 |
| Storage stability | 1 | 2 | 3 | 4 | 4 | 2 | 4 | 3 | 3 | 4 | 4 | 4 |
| Quantity of charge ($\mu$C/g) | 21.4 | 20.0 | 10.0 | 8.5 | 8.3 | −6.8 | 6.6 | 10.0 | 10.1 | 14.3 | 14.5 | 18.6 |

L-L.A. denotes L-lactic acid; D-L.A denotes D-lactic acid; Glyce. denotes glycerine; E.G. denotes ethylene glycol; D.E.G. denotes diethylene glycol; T.M.E. denotes trimethylolethane; T.M.P. denotes trimethylolpropane; P.E. denotes pentaerythritol.

EXAMPLES 25 to 38

Poly-($\alpha$-hydroxycarboxylic acids) were prepared by dehydration-polycondensation of $\alpha$-hydroxycarboxylic acids listed in the following Table 4 according to the same procedures used in Examples 1 to 7 except that any refluxing solvent was not used. Then each resulting poly-($\alpha$-hydroxycarboxylic acid) was further polycondensed with a polyhydric alcohol listed in Table 4 till the acid value of the polymer reached a predetermined level to give each corresponding polyester listed in Table 4. Each polyester resin (1000 g) was then reacted with a diisocyanate listed in Table 4 in a molten state to give a corresponding urethane-modified polyester resin listed in Table 4.

There were mixed and dispersed, in a Henschel mixer, 100 parts of each urethane-modified polyester resin prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.), then the mixture was melted and kneaded at 160° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 $\mu$m (containing 3% by weight of particles having a particle size of not more than 5 $\mu$m, 2% by weight of particles having a particle size of not less than 20 $\mu$m).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F53-150 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated state. The results thus obtained are listed in Table 4.

As seen from the data in Table 4, the resins according to the present invention show excellent grindability, resistance to hot-offset, storage stability and abilities of being positively charged and thus can effectively be used as resins for electrophotographic toner capable of being positively charged.

TABLE 4

| Example Nos. | 25 | 26 | 27 | 28 | 29 | 30 | 31 | 32 |
|---|---|---|---|---|---|---|---|---|
| $\alpha$-hydroxycarboxylic acid(1) | L-L.A. | L-L.A. | L-L.A. | L-L.A. | L-L.A. | L-L.A. | L-L.A. | L-L.A. |
| Amount of $\alpha$-hydroxy-carboxylic acid(1) (mole) | 5.0 | 5.0 | 5.0 | 5.0 | 5.0 | 5.0 | 5.0 | 5.0 |
| $\alpha$-hydroxycarboxylic acid(2) | D-L.A. | D-L.A. | D-L.A. | D-L.A. | D-L.A. | D-L.A. | D-L.A. | D-L.A. |
| Amount of $\alpha$-hydroxy-carboxylic acid(2) (mole) | 5.0 | 5.0 | 5.0 | 5.0 | 5.0 | 5.0 | 5.0 | 5.0 |
| Molecular weight of poly-($\alpha$-hydroxycarboxylic acid) | 1000 | 2000 | 4000 | 7000 | 8000 | 4000 | 4000 | 4000 |
| Polyhydric alcohol | Glyce. | Glyce. | Glyce. | Glyce. | Glyce. | Glyce. | Glyce. | Glyce. |
| Amount of polyhydric alcohol (mole) | 0.700 | 0.350 | 0.175 | 0.100 | 0.088 | 0.175 | 0.175 | 0.175 |
| Number-average molecular weight of polyester | 3100 | 6000 | 12000 | 21000 | 24100 | 12000 | 12000 | 12000 |
| Glass transition point of polyester obtained (°C.) | 34.2 | 45.7 | 51.6 | 54.1 | 54.5 | 51.6 | 51.6 | 51.6 |
| Acid value of polyester (mg/g) | 2.7 | 1.4 | 0.7 | 0.4 | 0.3 | 0.7 | 0.7 | 0.7 |
| Hydroxyl value of polyester (mg/g) | 52.1 | 26.4 | 13.3 | 7.6 | 6.6 | 13.3 | 13.3 | 13.3 |
| Amount of hexamethylene diisocyanate (mmol equivalent) | 0.882 | 0.447 | 0.225 | 0.129 | 0.113 | 0.071 | 0.142 | 0.166 |
| NCO/OH | 0.95 | 0.95 | 0.95 | 0.95 | 0.96 | 0.30 | 0.60 | 0.70 |
| Number-average molecular weight of urethane-polyester | 19900 | 39300 | 77900 | 136500 | 156000 | 15000 | 18000 | 23000 |
| Glass transition point of urethane-polyester (°C.) | 51.3 | 54.3 | 55.9 | 56.6 | 56.7 | 50.8 | 52.8 | 54.2 |
| Volume-Average Particle Size ($\mu$m) | 22.3 | 32.8 | 39.7 | 38.8 | 40.7 | 15.4 | 21.5 | 24.7 |

TABLE 4-continued

| | | | | | | | | |
|---|---|---|---|---|---|---|---|---|
| Rate of Fixing (%) | 95 | 90 | 85 | 77 | 75 | 96 | 94 | 92 |
| Hot-Offset temperature (°C.) | 251 | 253 | 251 | 253 | 253 | 152 | 168 | 183 |
| Storage Stability | 3 | 4 | 4 | 4 | 4 | 1 | 2 | 3 |
| Quantity of charge ($\mu$C/g) | 39.2 | 23.3 | 15.3 | 11.8 | 11.2 | 21.4 | 20.0 | 10.0 |

| Example Nos. | 33 | 34 | 35 | 36 | 37 | 38 |
|---|---|---|---|---|---|---|
| $\alpha$-hydroxycarboxylic acid(1) | L-L.A. | L-L.A. | L-L.A. | L-L.A. | L-L.A. | L-L.A. |
| Amount of $\alpha$-hydroxycarboxylic acid(1) (mole) | 5.0 | 5.0 | 5.0 | 5.0 | 5.0 | 5.0 |
| $\alpha$-hydroxycarboxylic acid(2) | D-L.A. | D-L.A. | D-L.A. | D-L.A. | D-L.A. | D-L.A. |
| Amount of $\alpha$-hydroxycarboxylic acid(2) (mole) | 5.0 | 5.0 | 5.0 | 5.0 | 5.0 | 5.0 |
| Molecular weight of poly-($\alpha$-hydroxycarboxylic acid) | 4000 | 4000 | 900 | 1000 | 4000 | 7000 |
| Polyhydric alcohol | Glyce. | Glyce. | E.G. | D.E.G. | T.M.E. | T.M.P. |
| Amount of polyhydric alcohol (mole) | 0.175 | 0.175 | 0.778 | 0.700 | 0.175 | 0.100 |
| Number-average molecular weight of polyester obtained | 12000 | 12000 | 2800 | 3100 | 12000 | 21000 |
| Glass transition point of polyester obtained (°C.) | 51.6 | 51.6 | 31.7 | 34.2 | 51.6 | 54.1 |
| Acid value of polyester (mg/g) | 0.7 | 0.7 | 3.0 | 2.7 | 0.7 | 0.4 |
| Hydroxyl value of polyester (mg/g) | 13.3 | 13.3 | 57.7 | 52.1 | 13.2 | 7.6 |
| Amount of hexamethylene diisocyanate (mmol equivalent) | 0.189 | 0.213 | 0.355 | 0.355 | 0.237 | 0.118 |
| NCO/OH | 0.80 | 0.90 | 0.35 | 0.38 | 1.01 | 0.87 |
| Number-average molecular weight of urethane-polyester | 32000 | 52000 | 18400 | 18500 | 82000 | 82000 |
| Glass transition point of urethane-polyester (°C.) | 54.8 | 55.7 | 52.8 | 52.7 | 56 | 56 |
| Volume-Average Particle Size ($\mu$m) | 31.0 | 35.4 | 21.2 | 21.2 | 15.2 | 15.2 |
| Rate of Fixing (%) | 83 | 73 | 94 | 94 | 84 | 84 |
| Hot-Offset temperature (°C.) | 210 | 252 | 185 | 185 | 252 | 253 |
| Storage Stability | 4 | 4 | 4 | 4 | 4 | 4 |
| Quantity of charge ($\mu$C/g) | 8.5 | 8.3 | 18.3 | 18.3 | 17.0 | 17.0 |

L-L.A. denotes L-lactic acid; D-L.A denotes D-lactic acid; Glyce. denotes glycerine; E.G. denotes ethylene glycol; D.E.G. denotes diethylene glycol; T.M.E. denotes trimethylolethane; T.M.P. denotes trimethylolpropane;

EXAMPLES 39 to 48

Amorphous poly-( $\alpha$-hydroxycarboxylic acids ) were prepared by dehydration-polycondensation of G -hydroxycarboxylic acids listed in the following Table 5 according to the same procedures used in Examples 1 to 7 except that any refluxing solvent was not used. Then each resulting poly-( $\alpha$-hydroxycarboxylic acid) was further polycondensed with a polycarboxylic acid listed in Table 5 till the acid value reached a predetermined level to give each corresponding polyester listed in Table 5.

There were mixed and dispersed, in a Henschel mixer, 100 parts of each polyester prepared above (resin for toner), 6 parts of carbon black MA-100 <available from Mitsubishi Chemical Industries Ltd. ) and 3 parts of a polypropylene wax, Biscol 660P, (available from Sanyo Chemical Industry Co., Ltd.) then the mixture was melted and kneaded at 160° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 $\mu$m (containing 3% by weight of particles having a particle size of not more than 5 $\mu$m, 2% by weight of particles having a particle size of not more than 2 0 $\mu$m).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time,-the hot rolls were inspected for the degree of contamination with the toner.

After mixing 95 parts of a ferrite carrier F95-100 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated state thereof. The results thus obtained are summarized in Table 5.

As seen from the data in Table 5, the resins according to the present invention show excellent grindability, resistance to hot offset, storage stability and abilities of being negatively charged and thus can effectively be used as resins for electrophotographic toner capable of being negatively charged.

TABLE 5

| Example Nos. | 39 | 40 | 41 | 42 | 43 | 44 | 45 | 46 | 47 | 48 |
|---|---|---|---|---|---|---|---|---|---|---|
| $\alpha$-hydroxycarboxylic acid(1) | L-L.A. | L-L.A. | L-L.A. | L-L.A. | L-L.A. | L-L.A. | L-L.A. | L-L.A. | L-L.A. | L-L.A. |
| Amount of $\alpha$-hydroxy- | 5.0 | 5.0 | 5.0 | 5.0 | 5.0 | 5.0 | 5.0 | 5.0 | 5.0 | 5.0 |

TABLE 5-continued

| Example Nos. | 39 | 40 | 41 | 42 | 43 | 44 | 45 | 46 | 47 | 48 |
|---|---|---|---|---|---|---|---|---|---|---|
| carboxylic acid(1) (mole) | | | | | | | | | | |
| α-hydroxycarboxylic acid(2) | D-L.A. | D-L.A. | D-L.A. | D-L.A. | D-L.A. | D-L.A. | D-L.A. | D-L.A. | D-L.A. | D-L.A. |
| Amount of α-hydroxycarboxylic acid(2) (mole) | 5.0 | 5.0 | 5.0 | 5.0 | 5.0 | 5.0 | 5.0 | 5.0 | 5.0 | 5.0 |
| Molecular weight of poly-(α-hydroxycarboxylic acid) | 900 | 1000 | 4000 | 7000 | 8000 | 4000 | 4000 | 4000 | 4000 | 4000 |
| Polycarboxylic acid | T.M.A. | T.M.A. | T.M.A. | T.M.A. | T.M.A. | Nil | T.M.A. | I.P.A. | S.A. | P.M.A. |
| Amount of polycarboxylic acid (mole) | 0.259 | 0.233 | 0.058 | 0.033 | 0.029 | | 0.047 | 0.088 | 0.088 | 0.088 |
| Number-average molecular weight of polyester obtained | 2900 | 3200 | 12200 | 21200 | 24200 | 4000 | 8600 | 8100 | 8000 | 12200 |
| Glass transition point of polyester obtained (°C.) | 34.4 | 36.7 | 53.1 | 55.5 | 55.9 | 40.1 | 48.0 | 50.0 | 50.0 | 52.9 |
| Acid value of polyester (mg/g) | 36.6 | 33.2 | 8.7 | 5.0 | 4.4 | 14.0 | 10.4 | 14.6 | 14.7 | 9.7 |
| Hydroxyl value of polyester (mg/g) | 1.9 | 1.7 | 0.5 | 0.3 | 0.2 | 14.0 | 2.6 | 0.7 | 0.7 | 0.5 |
| Rate of hydroxyl groups in the terminal groups (%) | 95.1 | 95.1 | 94.6 | 94.3 | 95.7 | 50.0 | 80.0 | 95.4 | 95.5 | 95.1 |
| Volume-average particle size (μm) | 7.5 | 7.9 | 16.5 | 26.6 | 31.6 | 56.0 | 13.4 | 12.9 | 12.8 | 16.5 |
| Rate of fixing (%) | 99 | 98 | 95 | 92 | 91 | 99 | 99 | 98 | 98 | 95 |
| Hot-offset temperature (°C.) | 204 | 224 | 240 | 240 | 248 | 133 | 181 | 177 | 177 | 222 |
| Storage stability | 1 | 2 | 3 | 4 | 4 | 2 | 3 | 3 | 3 | 3 |
| Quantity of charge (μC/g) | −46.4 | −42.4 | −12.9 | −8.5 | −7.7 | −24.0 | −5.8 | −18.2 | −18.3 | −13.0 |

L-L.A. denotes L-lactic acid; D-L.A. denotes D-lactic acid; T.M.A. denotes trimellitic anhydride; I.P.A. denotes isophthalic acid; S.A. denotes succinic acid; P.M.A. denotes pyromellitic anhydride.

EXAMPLES 49 to 60

Semicrystalline poly-(α-hydroxycarboxylic acids) were prepared by dehydration-polycondensation of α-hydroxycarboxylic acids listed in the following Table 6 according to the same procedures used in Examples 1 to 7 except that any refluxing solvent was not used. Then each resulting poly-(α-hydroxycarboxylic acid) was further polycondensed with a polyhydric alcohol listed in Table 6 till the acid value of the polymer reached a predetermined level to give each corresponding polyester listed in Table 6.

There were mixed and dispersed, in a Henschel mixer, 100 parts of each polyester resin prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.) then the mixture was melted and kneaded at 160° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 μm (containing 3% by weight of particles having a particle size of not more than 5 μm, 2% by weight of particles having a particle size of not less than 20 μm).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F53-150 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated condition thereof. The results thus obtained are listed in Table 6.

As seen from the data in Table 6, the resins according to the present invention show excellent grindability, resistance to hot-offset, storage stability and abilities of being positively charged and thus can effectively be used as resins for electrophotographic toner capable of being positively charged.

TABLE 6

| Example Nos. | 49 | 50 | 51 | 52 | 53 | 54 | 55 | 56 | 57 | 58 | 59 | 60 |
|---|---|---|---|---|---|---|---|---|---|---|---|---|
| α-hydroxycarboxylic acid(1) | L-L.A. | L-L.A. | L-L.A. | L-L.A. | L-L.A. | L-L.A. | L-L.A. | L-L.A. | L-L.A. | L-L.A. | L-L.A. | L-L.A. |
| Amount of α-hydroxycarboxylic acid(1) (mole) | 10.0 | 10.0 | 10.0 | 10.0 | 10.0 | 10.0 | 10.0 | 10.0 | 10.0 | 10.0 | 10.0 | 10.0 |
| α-hydroxycarboxylic acid(2) | D-L.A. | D-L.A. | D-L.A. | D-L.A. | D-L.A. | D-L.A. | D-L.A. | D-L.A. | D-L.A. | D-L.A. | D-L.A. | D-L.A. |
| Amount of α-hydroxycarboxylic acid(2) (mole) | 0 | 0 | 0 | 0 | 0 | 0 | 0 | 0 | 0 | 0 | 0 | 0 |
| Molecular weight of poly-(α-hydroxycarboxylic acid) | 900 | 1000 | 4000 | 7000 | 8000 | 4000 | 4000 | 4000 | 4000 | 4000 | 4000 | 4000 |
| Polyhydric alcohol | Glyce. | Glyce. | Glyce. | Glyce. | Glyce. | Nil | Glyce. | E.G. | D.E.G. | T.M.E. | T.M.P. | P.E. |
| Amount of polyhydric alcohol (mole) | 0.778 | 0.700 | 0.175 | 0.100 | 0.088 | | 0.047 | 0.088 | 0.088 | 0.088 | 0.088 | 0.088 |
| Number-average molecular weight of polyester obtained | 2800 | 3000 | 12100 | 21000 | 24100 | 4000 | 8600 | 8000 | 8100 | 12000 | 12300 | 12100 |
| Glass transition point of | 31.5 | 34.1 | 51.6 | 54.1 | 54.5 | 39.7 | 49.2 | 48.6 | 43.3 | 46.6 | 49.7 | 46.9 |

TABLE 6-continued

| Example Nos. | 49 | 50 | 51 | 52 | 53 | 54 | 55 | 56 | 57 | 58 | 59 | 60 |
|---|---|---|---|---|---|---|---|---|---|---|---|---|
| polyester obtained (°C.) | | | | | | | | | | | | |
| Acid value of polyester (mg/g) | 3.1 | 2.8 | 0.7 | 0.4 | 0.3 | 14.0 | 2.6 | 0.7 | 0.7 | 0.7 | 0.7 | 0.7 |
| Hydroxyl value of polyester (mg/g) | 58.3 | 52.5 | 13.3 | 7.6 | 6.6 | 14.0 | 10.4 | 13.3 | 13.3 | 17.5 | 17.4 | 26.4 |
| Rate of hydroxyl groups in the terminal groups (%) | 95.0 | 94.9 | 95.0 | 95.0 | 95.7 | 50.0 | 80.0 | 95.0 | 95.0 | 96.2 | 96.1 | 97.4 |
| Volume-average particle size ($\mu$m) | 7.3 | 7.7 | 16.4 | 26.4 | 31.3 | 8.7 | 13.4 | 53.0 | 55.0 | 56.0 | 54.6 | 58.3 |
| Rate of fixing (%) | 94 | 91 | 76 | 73 | 72 | 87 | 78 | 79 | 83 | 80 | 77 | 80 |
| Hot-offset temperature (°C.) | 194 | 194 | 200 | 207 | 209 | 122 | 171 | 165 | 166 | 201 | 201 | 200 |
| Storage stability | 1 | 2 | 3 | 4 | 4 | 2 | 4 | 3 | 3 | 4 | 4 | 4 |
| Quantity of charge ($\mu$C/g) | 21.6 | 20.1 | 10.0 | 8.5 | 8.3 | −6.7 | 6.6 | 10.0 | 10.0 | 11.7 | 11.7 | 14.6 |

L-L.A. denotes L-lactic acid; D-L.A denotes D-lactic acid; Glyce. denotes glycerine; E.G. denotes ethylene glycol; D.E.G. denotes diethylene glycol; T.M.E. denotes trimethylolethane; T.M.P. denotes trimethylolpropane; P.E. denotes pentaerythritol.

EXAMPLES 61 to 75

Poly-($\alpha$-hydroxycarboxylic acids) were prepared by dehydration-polycondensation of $\alpha$-hydroxycarboxylic acids listed in the following Table 7 according to the same procedures used in Examples 1 to 7 except that any refluxing solvent was not used. Then each resulting poly-($\alpha$-hydroxycarboxylic acid) was further polycondensed with a polyhydric alcohol listed in Table 7 till the acid value of the polymer reached a predetermined level to give each corresponding polyester listed in Table 7. Each polyester resin (1000 g) was reacted with a diisocyanate listed in Table 7 in a molten state to give a corresponding urethane-modified polyester resin listed in Table 7.

There were mixed and dispersed, in a Henschel mixer, 100 parts of each urethane-modified polyester resin prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.), then the mixture was melted and kneaded at 160° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 $\mu$m (containing 3% by weight of particles having a particle size of not more than 5 $\mu$m, 2% by weight of particles having a particle size of not less than 20 $\mu$m).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F53-150 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated condition thereof. The results thus obtained are listed in Table 7.

As seen from the data in Table 7, the resins according to the present invention show excellent grindability, resistance to hot-offset, storage stability and abilities of being positively charged and thus can effectively be used as resins for electrophotographic toner capable of being positively charged.

TABLE 7

| Example Nos. | 61 | 62 | 63 | 64 | 65 | 66 | 67 | 68 | 69 |
|---|---|---|---|---|---|---|---|---|---|
| $\alpha$-hydroxycarboxylic acid(1) | L-L.A. | L-L.A. | L-L.A. | L-L.A. | L-L.A. | L-L.A. | L-L.A. | L-L.A. | L-L.A. |
| Amount of $\alpha$-hydroxycarboxylic acid(1) (mole) | 10.0 | 10.0 | 10.0 | 10.0 | 10.0 | 10.0 | 10.0 | 10.0 | 10.0 |
| $\alpha$-hydroxycarboxylic acid(2) | D-L.A. | D-L.A. | D-L.A. | D-L.A. | D-L.A. | D-L.A. | D-L.A. | D-L.A. | D-L.A. |
| Amount of $\alpha$-hydroxycarboxylic acid(2) (mole) | 0.0 | 0.0 | 0.0 | 0.0 | 0.0 | 0.0 | 0.0 | 0.0 | 0.0 |
| Molecular weight of poly-($\alpha$-hydroxycarboxylic acid) | 1000 | 2000 | 4000 | 7000 | 8000 | 4000 | 4000 | 4000 | 4000 |
| Polyhydric alcohol | Glyce. | Glyce. | Glyce. | Glyce. | Glyce. | Glyce. | Glyce. | Glyce. | Glyce. |
| Amount of polyhydric alcohol (mole) | 0.700 | 0.350 | 0.175 | 0.100 | 0.088 | 0.175 | 0.175 | 0.175 | 0.175 |
| Number-average molecular weight of polyester obtained | 3000 | 6000 | 12000 | 21000 | 24000 | 12000 | 12000 | 12000 | 12000 |
| Glass transition point of polyester obtained (°C.) | 34.1 | 45.7 | 51.6 | 54.1 | 54.5 | 51.6 | 51.6 | 51.6 | 51.6 |
| Acid value of polyester (mg/g) | 2.8 | 1.4 | 0.7 | 0.4 | 0.3 | 0.7 | 0.7 | 0.7 | 0.7 |
| Hydroxyl value of polyester (mg/g) | 52.5 | 26.4 | 13.3 | 7.6 | 6.6 | 13.3 | 13.3 | 13.3 | 13.3 |
| Amount of hexamethylene diisocyanate (mmol equivalent) | 0.890 | 0.448 | 0.225 | 0.129 | 0.113 | 0.071 | 0.142 | 0.166 | 0.189 |
| NCO/OH | 0.95 | 0.95 | 0.95 | 0.95 | 0.96 | 0.30 | 0.60 | 0.70 | 0.80 |
| Number-average molecular weight of urethane-polyester | 19700 | 39200 | 78000 | 136000 | 156000 | 15000 | 17700 | 22700 | 31700 |

TABLE 7-continued

| | | | | | | | | | |
|---|---|---|---|---|---|---|---|---|---|
| Glass transition point of urethane-polyester (°C.) | 51.2 | 54.3 | 55.9 | 56.6 | 56.7 | 50.6 | 53.0 | 53.9 | 54.7 |
| Volume-Average Particle Size (μm) | 22.1 | 32.7 | 33.1 | 38.7 | 40.5 | 15.1 | 20.7 | 24.1 | 29.3 |
| Rate of Fixing (%) | 75 | 70 | 65 | 57 | 55 | 76 | 74 | 73 | 71 |
| Hot-Offset temperature (°C.) | 253 | 254 | 254 | 256 | 258 | 146 | 166 | 181 | 206 |
| Storage Stability | 3 | 4 | 4 | 4 | 4 | 4 | 4 | 4 | 4 |
| Quantity of charge (μC/g) | 49.5 | 23.4 | 15.3 | 11.8 | 11.2 | 11.6 | 13.3 | 13.9 | 14.4 |

| Example Nos. | 70 | 71 | 72 | 73 | 74 | 75 |
|---|---|---|---|---|---|---|
| α-hydroxycarboxylic acid(1) | L-L.A. | L-L.A. | L-L.A. | L-L.A. | L-L.A. | L-L.A. |
| Amount of α-hydroxycarboxylic acid(1) (mole) | 10.0 | 10.0 | 10.0 | 10.0 | 10.0 | 10.0 |
| α-hydroxycarboxylic acid(2) | D-L.A. | D-L.A. | D-L.A. | D-L.A. | D-L.A. | D-L.A. |
| Amount of α-hydroxycarboxylic acid(2) (mole) | 0.0 | 0.0 | 0.0 | 0.0 | 0.0 | 0.0 |
| Molecular weight of poly-(α-hydroxycarboxylic acid) | 4000 | 4000 | 4000 | 4000 | 4000 | 4000 |
| Polyhydric alcohol | Glyce. | E.G. | D.E.G. | T.M.E. | T.M.P. | P.E. |
| Amount of polyhydric alcohol (mole) | 0.175 | 0.778 | 0.700 | 0.175 | 0.100 | 0.088 |
| Number-average molecular weight of polyester obtained | 12000 | 8000 | 8100 | 12200 | 12200 | 12100 |
| Glass transition point of polyester obtained (°C.) | 51.6 | 48.6 | 48.7 | 51.6 | 51.7 | 51.6 |
| Acid value of polyester (mg/g) | 0.7 | 0.7 | 0.7 | 0.5 | 0.5 | 0.5 |
| Hydroxyl value of polyester (mg/g) | 13.3 | 13.3 | 13.3 | 17.5 | 17.4 | 26.4 |
| Amount of hexamethylene diisocyanate (mmol equivalent) | 0.213 | 0.237 | 0.235 | 0.255 | 0.255 | 0.48 |
| NCO/OH | 0.90 | 1.00 | 0.99 | 0.82 | 0.82 | 1.02 |
| Number-average molecular weight of urethane-polyester | 52500 | 18400 | 18500 | 81900 | 82100 | 61900 |
| Glass transition point of urethane-polyester (°C.) | 55.5 | 52.6 | 52.6 | 55.9 | 55.9 | 55.6 |
| Volume-Average Particle Size (μm) | 36.9 | 21.2 | 21.2 | 38.3 | 38.3 | 38.7 |
| Rate of Fixing (%) | 68 | 74 | 94 | 84 | 84 | 87 |
| Hot-Offset temperature (°C.) | 250 | 185 | 185 | 250 | 250 | 250 |
| Storage Stability | 4 | 4 | 4 | 4 | 4 | 4 |
| Quantity of charge (μC/g) | 15.0 | 18.4 | 18.3 | 17.0 | 17.0 | 19.5 |

L-L.A. denotes L-lactic acid; D-L.A denotes D-lactic acid; Glyce. denotes glycerine; E.G. denotes ethylene glycol; D.E.G. denotes diethylene glycol; T.M.E. denotes trimethyolethane; T.M.P. denotes trimethylolpropane; P.E. denotes pentaerythritol.

EXAMPLES 76 to 85

Semicrystalline poly-(α-hydroxycarboxylic acids) were prepared by dehydration-polycondensation of α-hydroxycarboxylic acids listed in the following Table 8 according to the same procedures used in Examples 1 to 7 except that any refluxing solvent was not used. Then each resulting poly-(α-hydroxycarboxylic acid) was further polycondensed with a polycarboxylic acid listed in Table 8 till the acid value thereof reached a predetermined level to give each corresponding polyester listed in Table 8.

There were mixed and dispersed, in a Henschel mixer, 100 parts of each polyester prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.) then the mixture was melted and kneaded at 160° C. in a twin-screw kneader PCM 30 (available from Ikegai Corporation) to give a massive toner composition.

This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10 μm (containing 3% by weight of particles having a particle size of not more than 5 μm, 2% by weight of particles having a particle size of not more than 20 μm).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F95-100 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated state. These results obtained are summarized in Table 8.

As seen from the data in Table 8, the resins according to the present invention show excellent grindability, resistance to hot-offset, storage stability and abilities of being negatively charged and thus can effectively be used as resins for electrophotographic toner capable of being negatively charged.

TABLE 8

| Example Nos. | 76 | 77 | 78 | 79 | 80 | 81 | 82 | 83 | 84 | 85 |
| --- | --- | --- | --- | --- | --- | --- | --- | --- | --- | --- |
| α-hydroxycarboxylic acid(1) | L-L.A. | L-L.A. | L-L.A. | L-L.A. | L-L.A. | L-L.A. | L-L.A. | L-L.A. | L-L.A. | L-L.A. |
| Amount of α-hydroxycarboxylic acid(1) (mole) | 10.0 | 10.0 | 10.0 | 10.0 | 10.0 | 10.0 | 10.0 | 10.0 | 10.0 | 10.0 |
| α-hydroxycarboxylic acid(2) | D-L.A. | D-L.A. | D-L.A. | D-L.A. | D-L.A. | D-L.A. | D-L.A. | D-L.A. | D-L.A. | D-L.A. |
| Amount of α-hydroxycarboxylic acid(2) (mole) | 0.0 | 0.0 | 0.0 | 0.0 | 0.0 | 0.0 | 0.0 | 0.0 | 0.0 | 0.0 |
| Molecular weight of poly-(α-hydroxycarboxylic acid) | 900 | 1000 | 4000 | 7000 | 8000 | 4000 | 4000 | 4000 | 4000 | 4000 |
| Polycarboxylic acid | T.M.A. | T.M.A. | T.M.A. | T.M.A. | T.M.A. | Nil | T.M.A. | I.P.A. | S.A. | P.M.A. |
| Amount of polycarboxylic acid (mole) | 0.259 | 0.233 | 0.058 | 0.033 | 0.029 |  | 0.050 | 0.088 | 0.088 | 0.088 |
| Number-average molecular weight of polyester obtained | 2900 | 3200 | 12200 | 21200 | 24200 | 4000 | 8600 | 8100 | 8100 | 12200 |
| Glass transition point of polyester obtained (°C.) | 33.1 | 35.4 | 51.7 | 54.1 | 54.5 | 41.6 | 49.2 | 48.7 | 48.7 | 51.6 |
| Acid value of polyester (mg/g) | 36.4 | 33.0 | 8.7 | 5.0 | 4.4 | 14.0 | 10.4 | 14.7 | 14.8 | 9.3 |
| Hydroxyl value of polyester (mg/g) | 1.9 | 1.7 | 0.5 | 0.3 | 0.2 | 14.0 | 2.6 | 0.7 | 0.7 | 0.5 |
| Rate of hydroxyl groups in the terminal groups (%) | 95.0 | 95.1 | 94.6 | 94.3 | 95.7 | 50.0 | 80.0 | 95.5 | 95.5 | 94.9 |
| Volume-average particle size (μm) | 7.5 | 7.9 | 16.6 | 26.6 | 31.7 | 8.8 | 13.4 | 12.9 | 12.9 | 16.5 |
| Rate of fixing (%) | 92 | 90 | 76 | 73 | 72 | 85 | 78 | 79 | 79 | 76 |
| Hot-offset temperature (°C.) | 205 | 205 | 221 | 242 | 249 | 131 | 182 | 176 | 176 | 220 |
| Storage stability | 1 | 2 | 3 | 4 | 4 | 2 | 3 | 3 | 3 | 3 |
| Quantity of charge (μC/g) | −46.2 | −42.2 | −12.9 | −8.5 | −7.7 | −24.0 | −5.8 | −18.2 | −18.5 | −13.2 |

L-L.A. denotes L-lactic acid; D-L.A denotes D-lactic acid; T.M.A. denotes trimellitic anhydride; I.P.A. denotes isophthalic acid; S.A. denotes succinic acid; P.M.A. denotes pyromellitic anhydride.

EXAMPLES 86 to 90

These Examples (Comparative Examples) are herein given for illustrating the preparation of binder resins through cation ring opening polymerization. Cyclic dimers of α-hydroxycarboxylic acids listed in the following Table 9 as starting materials were polymerized according to the method disclosed in WO 92/01245. The solvent was removed from each resulting polymer solution through vacuum drying to give each corresponding polyester listed in Table 9.

There were mixed and dispersed, in a Henschel mixer, 100 parts of each polyester prepared above (resin for toner), 6 parts of carbon black MA-100 (available from Mitsubishi Chemical Industries Ltd.) and 3 parts of a polypropylene wax, Biscol 660P, (available from Sanyo Chemical Industry Co., Ltd.) then the mixture was melted and kneaded at 160° C. in a twin-screw kneader PCM 30 (available from Ikegai Corporation) to give a massive toner composition. This composition was roughly pulverized in a hammer mill, then finely pulverized in a jet pulverizer (available from Nippon Pneumatic Co., Ltd. under the trade name of IDS2 Model) and subjected to pneumatic classification to give toner particles having an average particle size of 10μm (containing 3% by weight of particles having a particle size of not more than 5 μm, 2% by weight of particles having a particle size of not more than 20 μm).

The grindability of the toner was expressed in terms of the volume-average particle size determined after pulverizing coarse powder while feeding the powder to the jet pulverizer at a constant rate.

The fixability and the offset ability of the toner was determined using a commercially available copying apparatus and at the same time, the hot rolls were inspected for the degree of contamination with the toner.

After mixing 95 parts of a ferrite carrier F95-100 (available from Nippon Iron Powder Co., Ltd.) and 5 parts of the toner for 30 minutes in a twin-cylinder mixer, the quantity of charges was determined by Blow-Off Charge-Determining Device (available from Toshiba Chemical Co., Ltd.).

Moreover, the storage stability of the toner was examined by storing the toner at a temperature of 40° C. and a relative humidity of 60% over 24 hours and then inspecting the toner particles for the agglomerated condition thereof. These results obtained are summarized in Table 9.

As seen from the data in Table 9, the poly(α-hydroxycarboxylic acid) of the present invention prepared through direct dehydration-polycondensation has excellent characteristic properties as compared with the poly-(α-hydroxycarboxylic acid) produced by ring opening polymerization. Accordingly, the toner prepared using the poly-(α-hydroxycarboxylic acid) produced by ring opening polymerization is inferior in, for instance, resistance to hot-offset to the toner prepared using the resin for toner according to the present invention.

TABLE 9

| Example Nos. | 86 | 87 | 88 | 89 | 90 |
| --- | --- | --- | --- | --- | --- |
| Cyclic dimer (1) | S-lactide | S-lactide | S-lactide | S-lactide | S-lactide |
| Amount of cyclic dimer (1) (mol) | 2.5 | 2.5 | 2.5 | 2.5 | 2.5 |
| Cyclic dimer (2) | R-lactide | R-lactide | R-lactide | R-lactide | R-lactide |
| Amount of cyclic dimer (2) (mol) | 2.5 | 2.5 | 2.5 | 0 | 0 |
| Dysprosium tris(2-N,N-dimethyl-aminoethoxide (mol) | 0.02 | 0.1 | 0.2 | 0.1 | 0.2 |
| Number-average molecular weight of polyester obtained | 36300 | 6800 | 3800 | 6500 | 4100 |
| Glass transition point of polyester obtained (°C.) | 55.4 | 48.6 | 40.9 | 48.3 | 42.1 |

TABLE 9-continued

| Example Nos. | 86 | 87 | 88 | 89 | 90 |
|---|---|---|---|---|---|
| Acid value of polyester (mg/g) | 1.5 | 8.3 | 14.8 | 8.6 | 13.7 |
| Hydroxyl value of polyester (mg/g) | 1.5 | 8.3 | 14.8 | 8.6 | 13.7 |
| Rate of hydroxyl groups in the terminal groups (%) | 50 | 50 | 50 | 50 | 50 |
| Volume-average particle size ($\mu$m) | 35.7 | 8.8 | 7 | 8.6 | 7.3 |
| Rate of fixing (%) | 80 | 85 | 86 | 65 | 67 |
| Hot-offset temperature (°C.) | 175 | 145 | 140 | 150 | 43 |
| Storage stability | 3 | 4 | 3 | 4 | 3 |
| Quantity of charge ($\mu$C/g) | 5.8 | −10 | −15.6 | −9 | −15.8 |

What is claimed is:

1. A resin for electrophotographic toner comprising a degradable polyester resin which is an amorphous or semicrystalline poly($\alpha$-hydroxycarboxylic acid) prepared by direct dehydration-polycondensation of an $\alpha$-hydroxycarboxylic acid.

2. The resin for electrophotographic toner as set forth in claim 1 wherein the degradable polyester resin is an amorphous poly-($\alpha$-hydroxycarboxylic acid) having a number-average molecular weight ranging from 2000 to 7000 and prepared by direct dehydration-polycondensation of an $\alpha$-hydroxycarboxylic acid.

3. The resin for electrophotographic toner as set forth in claim 1 wherein the degradable polyester resin is prepared by reacting a poly-($\alpha$-hydroxycarboxylic acid), having a number-average molecular weight ranging from 1000 to 7000 and prepared by direct dehydration-polycondensation of an $\alpha$-hydroxycarboxylic acid, with a polyol having at least three hydroxyl groups in the molecule and wherein the degradable polyester resin has a rate of the terminal hydroxyl groups of not less than 90% of the total terminal groups of the resin.

4. The resin for electrophotographic toner as set forth in claim 1 wherein the degradable polyester resin is an urethane-modified polyester which is produced by reacting a diisocyanate with a polyester consisting of an amorphous poly-($\alpha$-hydroxycarboxylic acid) which has a number-average molecular weight ranging from 2000 to 7000 and prepared by direct dehydration-polycondensation of an $\alpha$-hydroxycarboxylic acid with a polyol having, in the molecule, at least three hydroxyl groups so that isocyanate groups are added to the polyester in an amount of not less than 0.8 molar equivalent per molar equivalent of the hydroxyl group of the latter.

5. The resin for electrophotographic toner as set forth in claim 1 wherein the degradable polyester is a polymer produced by reacting an amorphous poly-($\alpha$-hydroxycarboxylic acid) having a number-average molecular weight ranging from 1000 to 7000 and prepared by direct dehydration-polycondensation of an $\alpha$-hydroxycarboxylic acid with a polycarboxylic acid having, in the molecule, at least three carboxyl groups and wherein the degradable polyester has a rate of terminal carboxyl groups of not less than 90% of the total terminal groups of the polyester.

6. A resin for electrophotographic toner comprising a degradable polyester resin which is one prepared by reacting a semicrystalline poly( $\alpha$-hydroxycarboxylic acid), having a number-average molecular weight ranging from 1000 to 7000 and prepared by direct dehydration-polycondensation of an $\alpha$-hydroxycarboxylic acid, with a polyol having at least three hydroxyl groups in the molecule and wherein the degradable polyester has a rate of the terminal hydroxyl groups of not less than 90% of the total terminal groups of the polyester.

7. A resin for electrophotographic toner comprising a degradable polyester which is an urethane-modified polyester produced by reacting a diisocyanate with a polyester, which is prepared by reacting a semicrystalline poly( $\alpha$-hydroxycarboxylic acid) having a number-average molecular weight ranging from 2000 to 7000 and prepared by direct dehydration-polycondensation of an $\alpha$-hydroxycarboxylic acid with a polyol having at least three hydroxyl groups in the molecule, so that isocyanate groups are added to the polyester in an amount of not less than 0.8 molar equivalent per molar equivalent of the hydroxyl group of the latter.

8. A resin for electrophotographic toner comprising a degradable polyester resin which is one prepared by reacting a semicrystalline poly-($\alpha$-hydroxycarboxylic acid), having a number-average molecular weight ranging from 100 to 7000 and prepared by direct dehydration-polycondensation of an $\alpha$-hydroxycarboxylic acid, with a polycarboxylic acid having at least three carboxyl groups in the molecule and which has a rate of terminal carboxyl groups of not less than 90% of the total terminal groups of the polyester.

* * * * *

UNITED STATES PATENT AND TRADEMARK OFFICE
CERTIFICATE OF CORRECTION

PATENT NO. : 5,387,665
DATED : February 7, 1995
INVENTOR(S) : Akira MISAWA, et al.

It is certified that error appears in the above-indentified patent and that said Letters Patent is hereby corrected as shown below:

On the title page, Item [54], and Column 1, Line 2, the title should read:

--RESINS FOR ELECTROPHOTOGRAPHIC TONERS--

Signed and Sealed this

Eighteenth Day of April, 1995

Attest:

BRUCE LEHMAN

Attesting Officer

Commissioner of Patents and Trademarks